(12) United States Patent
Patterson

(10) Patent No.: US 7,641,232 B2
(45) Date of Patent: Jan. 5, 2010

(54) PRESSURE REGULATOR

(75) Inventor: Donald B. Patterson, Rochester, MI (US)

(73) Assignee: Automotive Systems Laboratory, Inc., Armada, MI (US)

(*) Notice: Subject to any disclaimer, the term of this patent is extended or adjusted under 35 U.S.C. 154(b) by 342 days.

(21) Appl. No.: 11/361,936

(22) Filed: Feb. 23, 2006

(65) Prior Publication Data
US 2006/0202457 A1 Sep. 14, 2006

Related U.S. Application Data

(60) Provisional application No. 60/656,049, filed on Feb. 24, 2005.

(51) Int. Cl.
*B60R 21/26* (2006.01)
(52) U.S. Cl. .............. 280/736; 280/741; 280/742
(58) Field of Classification Search ............ 280/736, 280/737, 741, 742; 102/530, 531
See application file for complete search history.

(56) References Cited

U.S. PATENT DOCUMENTS

| | | | |
|---|---|---|---|
| 4,021,058 A | 5/1977 | Suzuki et al. ............ 280/737 |
| 4,172,465 A | 10/1979 | Dashner ................ 137/533.27 |
| 4,394,033 A | 7/1983 | Goetz et al. ............. 280/736 |
| 5,195,777 A | 3/1993 | Cuevas ................ 280/736 |
| 5,257,817 A | 11/1993 | Cuevas ................ 280/736 |
| 5,609,359 A | 3/1997 | Johnson et al. .......... 280/736 |
| 5,618,057 A | 4/1997 | Johnson et al. |
| 5,820,162 A * | 10/1998 | Fink ................. 280/742 |
| 6,039,347 A | 3/2000 | Maynard |
| 6,062,598 A | 5/2000 | Faigle ................ 280/736 |
| 6,168,200 B1 * | 1/2001 | Greist et al. ............ 280/736 |
| 6,176,518 B1 | 1/2001 | Faigle ................ 280/736 |
| 6,199,905 B1 | 3/2001 | Lewis |
| 6,231,078 B1 * | 5/2001 | Kokeguchi ............ 280/736 |
| 6,274,064 B1 * | 8/2001 | Wheatley ............ 252/186.21 |
| 6,789,820 B2 | 9/2004 | Meduvsky et al. ........ 280/742 |

(Continued)

FOREIGN PATENT DOCUMENTS

EP 0 570 347 A2 11/1993

OTHER PUBLICATIONS

Office Action having a mailing date of Oct. 4, 2007 regarding Publication No. US-2006-0197325 A1 (U.S. Appl. No. 11/365,374).

(Continued)

*Primary Examiner*—Toan C To
(74) *Attorney, Agent, or Firm*—L. C. Begin & Associates, PLLC

(57) ABSTRACT

A gas generator (10) is provided including a housing (12). A gas generating composition (16) produces expanded gases upon activation of the inflator (10), thereby increasing the internal pressure and compressing the spring (50) operably coupled to the gas release member (40). As the spring (50) is compressed, at least one gas exit aperture (44), sealed prior to gas generator (10) activation, is opened as the gas release member (40) slidably engages an inner wall (11) of the housing (12). After gas generator (10) activation, the spring energy of the spring (50) gradually equalizes and then exceeds the gas pressure of the system gases, thereby once again attenuating the gas exit opening to maintain an optimum average system pressure as the gas is released from the housing (12).

6 Claims, 2 Drawing Sheets

U.S. PATENT DOCUMENTS

| | | | |
|---|---|---|---|
| 7,325,829 B2* | 2/2008 | Kelley et al. | 280/736 |
| 7,341,276 B2* | 3/2008 | Kelley et al. | 280/736 |
| 7,438,316 B2 | 10/2008 | Patterson | 280/741 |
| 2004/0000777 A1* | 1/2004 | Meduvsky et al. | 280/742 |
| 2004/0041380 A1 | 3/2004 | Jung et al. | 280/736 |
| 2005/0110254 A1 | 5/2005 | Engler et al. | 280/736 |
| 2006/0197325 A1 | 9/2006 | Patterson | |
| 2006/0202457 A1 | 9/2006 | Patterson | 280/740 |
| 2006/0261584 A1* | 11/2006 | Blackburn | 280/741 |
| 2007/0075536 A1* | 4/2007 | Kelley et al. | 280/737 |
| 2007/0085309 A1 | 4/2007 | Kelley et al. | 280/736 |
| 2007/0085311 A1 | 4/2007 | Hofmann et al. | 280/739 |
| 2007/0228013 A1 | 10/2007 | Stevens | |

OTHER PUBLICATIONS

Office Action having a mailing date of Jan. 15, 2008 regarding Publication No. US-2007-0228013 A1 (U.S. Appl. No. 11/732,851).

Office Action U.S. Appl. No. 11/732,851, filed Apr. 4, 2007, Mailing date Jun. 10, 2009.

* cited by examiner

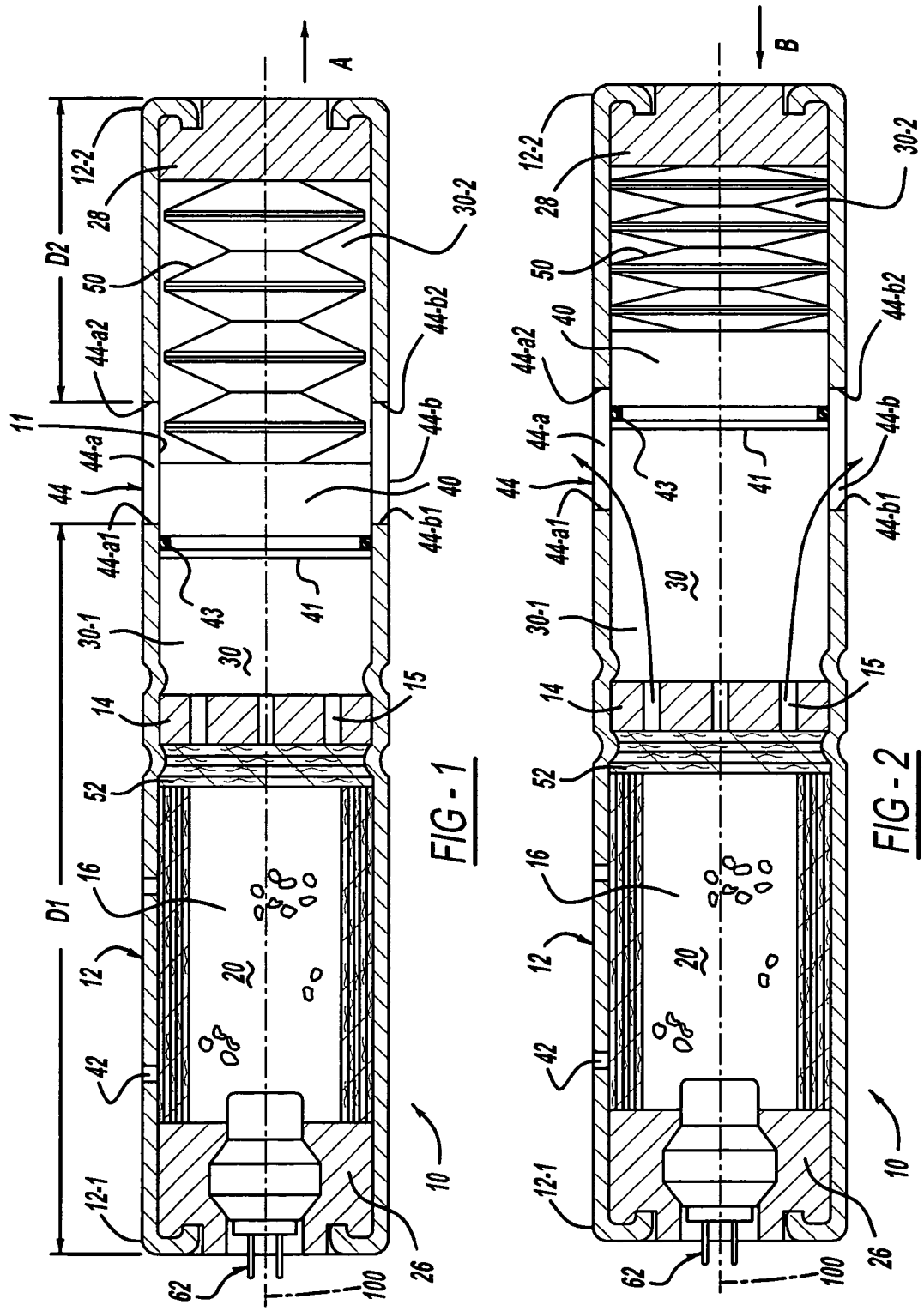

PRESSURE REGULATOR

CROSS-REFERENCE TO RELATED APPLICATIONS

The present application claims the benefit of U.S. Provisional Application Ser. No. 60/656,049 having a filing date of Feb. 24, 2005.

BACKGROUND OF THE INVENTION

The present invention relates to inflators for vehicle airbags and, more particularly, to an inflator incorporating a mechanism for maintaining inflator combustion pressure within a predetermined range.

Many solid propellants have an optimum pressure range for combustion. It can be difficult to maintain the inflator internal pressure within the optimum pressure range during the majority of the combustion reaction. In addition, low-pressure combustion of the propellant outside of the optimum pressure range may increase the generation of undesirable effluents. Furthermore, operating outside of the optimum combustion range may adversely affect the combustion, thereby abbreviating or shortening the burn of the propellant, or inhibiting sustained combustion of the propellant. Thus, it is desirable to maintain the inflator internal pressure within the optimum range for combustion of the propellant for as much of the combustion reaction as possible.

SUMMARY OF THE INVENTION

The above-referenced concerns are resolved by a gas generator containing a spring-biased gas release member to provide a sustained optimum combustion pressure. A gas generating composition contained within the gas generator produces expanded gases upon activation of the gas generator, thereby increasing the internal pressure and compressing the spring attached to the gas release member. As the spring is compressed, at least one gas exit aperture, sealed prior to gas generator activation, is opened as the gas release member slidably engages an inner wall of the gas generator. After gas generator activation, as the gas pressure gradually decreases, the spring energy of the spring gradually equalizes and then exceeds the gas pressure of the system gases, thereby once again attenuating the gas exit opening to maintain an optimum average system pressure as the gas is released from the housing. Accordingly, the spring-biased gas release member regulates pressure thereby affecting a resilient seal and at least partially sealing the gas exit orifice(s) as combustion pressure dissipates.

BRIEF DESCRIPTION OF THE DRAWINGS

FIG. 1 is a cross-sectional side view of an inflator in accordance with the present invention prior to inflator activation;

FIG. 2 is a cross-sectional side view of the inflator of FIG. 1 after inflator activation.

DETAILED DESCRIPTION

Figure 3:
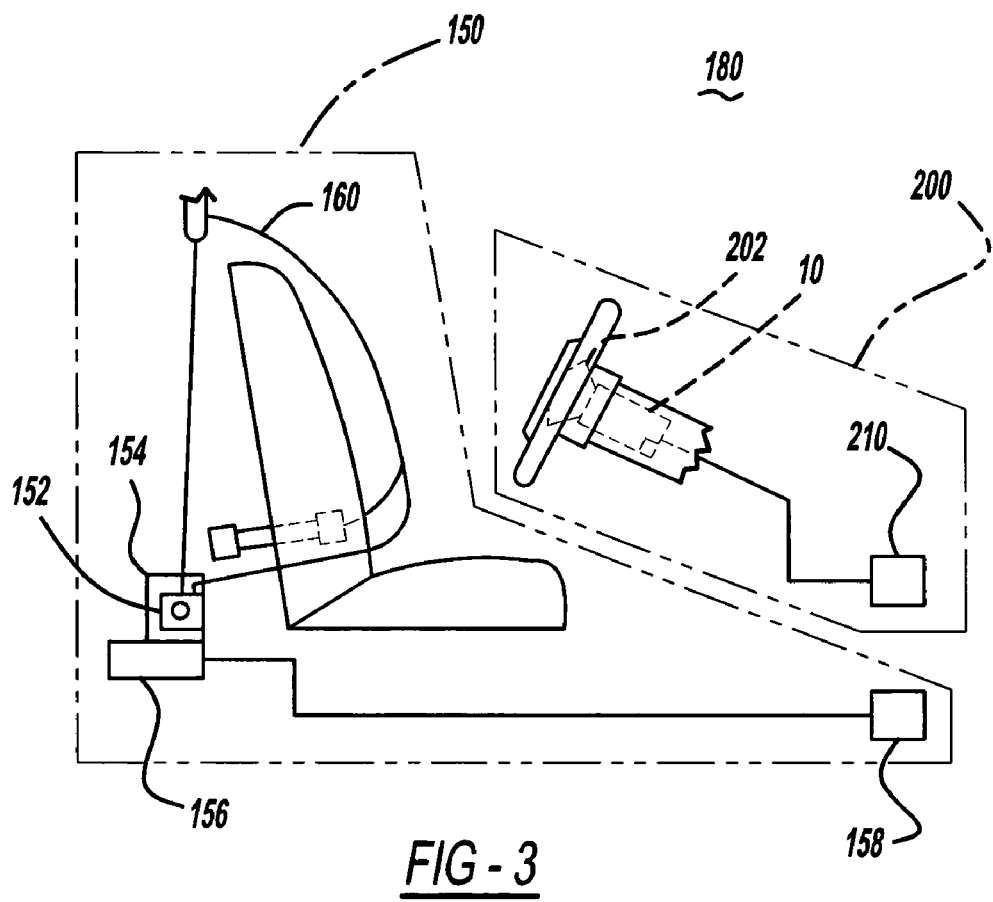
FIG. 3 exemplifies a combustion pressure regulation mechanism contained within a vehicle occupant protection system, in accordance with the present invention.

FIG. 1 shows a cross-sectional view of one embodiment of a gas generator or an inflator in accordance with the present invention. Inflator 10 is contemplated for use primarily in passenger-side inflatable restraint systems in motor vehicles, such as are known in the art; however, it is not limited thereto. The components of inflator 10 may be manufactured from known materials and by known processes.

Inflator 10 includes an elongate, generally cylindrical inflator body 12 defining an enclosure and having a first end 12-1, a second end 12-2, and a longitudinal axis 100. At least one gas exit orifice or aperture, and more preferably a first plurality of inflation gas exit apertures, generally designated 42, are formed along inflator body 12 to enable fluid communication between an interior of the inflator body and associated inflatable element of the vehicle occupant protection system (for example, an airbag). A second plurality of inflation gas exit apertures, generally designated 44, are formed along inflator body 12 to enable fluid communication between an interior of the inflator body and an exterior of the body. In a first embodiment, gas exit apertures 44 are in the form of substantially identical longitudinal slots 44-$a$, 44-$b$ extending substantially parallel with inflator body longitudinal axis 100. In this embodiment, apertures 44-$a$, 44-$b$ are circumferentially spaced substantially evenly around a periphery of housing or inflator body 12. In addition, apertures 44-$a$, 44-$b$ are equilaterally or circumferentially aligned along inflator body 12 such that the lengths of the apertures are substantially coextensive along the inflator body. That is, aperture first ends 44-$a$1, 44-$b$1 are each spaced apart from inflator body first end 12-1 a distance D1, while aperture second ends 44-$a$2, 44-$b$2 are each spaced apart from inflator body second end 12-1 a distance D2. Stated another way, apertures 44$a$ and 44$b$ are collateral whereby corresponding ends 44-$a$1 and 44-$b$1, and corresponding ends 44-$a$2 and 44-$b$2 are laterally or circumferentially aligned, respectively.

Inflator body 12 may be cast, stamped, extruded, or otherwise metal-formed. Apertures 44 may be formed along the inflator body by, for example, punching or piercing. In FIGS. 1 and 2, two apertures 44 are shown to illustrate the principles of the present invention. However, any desired number of apertures may be used, depending on design requirements.

Endcaps 26 and 28 are secured at opposite ends of inflator body 12 using one or more known methods, to close the ends of the inflator body. In FIG. 1, ends of inflator body 12 are crimped over portions of first and second caps 26, 28 to secure the caps within the inflator body. Endcaps 26 and 28 may be cast, stamped, extruded, or otherwise metal-formed. Alternatively, endcaps 26 and 28 may be molded from a suitable high-temperature resistant polymer.

A perforated internal wall 14 is disposed within inflator body 12 intermediate the ends thereof, defining first and second inflator chambers 20 and 30, respectively. Wall 14 is preferably formed from metal or ceramic and is substantially oriented along a plane perpendicular to a longitudinal axis 100 of inflator body 12. Wall 14 is roll-crimped or otherwise secured within inflator body 12 so as to maintain the wall in its position within the inflator body when the wall is subjected to pressures generated by combustion of gas generants stored within the inflator body. In a first embodiment, wall 14 is a substantially cylindrical member having a plurality of inflation gas exit apertures 15 formed therein.

A quantity of a propellant or gas generant composition 16 is positioned in chamber 20. Any suitable propellant might be used and exemplary compounds are disclosed, for example, in U.S. Pat. Nos. 5,872,329, 6,074,502, and 6,210,505, incorporated herein by reference. The compositions described in these patents exemplify, but do not limit, gas generant compositions useful in the described gas generator herein.

Referring again to FIG. 1, end cap 26 supports an igniter 62 operably associated with first chamber 20 such that it can ignite gas generant composition 16 in chamber 20 in a conventional manner. The illustrated position and orientation of igniter 62 might be varied without departing from the scope of the present invention, depending on space and manufacturing requirements. Further, igniter 62 need not be positioned within inflator body 12. One example of an igniter suitable for the application described herein is disclosed in U.S. Pat No. 6,009,809, incorporated herein by reference. Other igniters mountable so as to be in communication with chamber 20 may also be used.

A filter or buffer 52 is incorporated into the inflator design for filtering particulates from gases generated by combustion of gas generant 16. The filter also acts as a heat sink to reduce the temperature of the hot inflation gas. In general, filter 52 is positioned along internal walls of first chamber 20 and at an end of combustion first chamber 20, adjacent internal wall 14, to help ensure that inflation gas passes through the buffer before exiting first chamber 20. In a first embodiment, buffer 52 is formed from one or more layers of a compressed knitted metal wire, which is commercially available from vendors such as Metex Corp. of Edison, N.J. Other, suitable materials may also be used.

A piston 40 having a face 41 is positioned within chamber 30 to facilitate slidable engagement with an interior wall 11 of inflator body 12. A pliable seal 43 (for example, an O-ring seal) is secured along an outer surface of the piston so as to form a substantially gas-tight seal between piston 40 and the housing interior wall. Seal 43 is configured to slide freely within chamber 30 along the housing interior wall, in conjunction with piston 40. Accordingly, upon operation of the inflator 10, the piston or spring-biased gas release member 40, is slidably engaged within housing 12 as pressure increases upon combustion of the propellant 16. Concurrently therewith, the sliding action of the piston 40 opens apertures 44 thereby permitting release of the combustion gas therethrough. As a result, pressure begins to decrease, and piston 40 begins to again move to its pre-operation position, thereby affecting a relative increase in the pressure as the openings or open area of the apertures 40 are/is attenuated. Piston 40 and its associated seal 43 effectively fluidly divide chamber 30 into a pair of sub-chambers 30-1 and 30-2. Alternative types of seals or gaskets may be employed provided the alternative seals for a substantially gas-tight barrier between sub-chambers 30-1 and 30-2 that is movable in conjunction with piston 40.

Piston 40 may be cast, stamped, extruded, or otherwise metal-formed. Alternatively, piston 40 may be molded from a suitable high-temperature resistant polymer. In the embodiment shown in FIGS. 1 and 2, it is preferable that the design of piston 40 and the material from which the piston is formed be selected to minimize the mass of the piston. It is believed that these features reduce the static and dynamic inertia of the piston during actuation, thereby enhancing the responsiveness of the pressure regulation mechanism described herein. It will be appreciated that any spring-biased gas release member such as the piston 40, that essentially facilitates the same function as a spring-biased pressure regulator (further described below) may be utilized.

A spring member 50 is operably coupled to endcap 28 and to piston 40 for exerting a biasing force on piston 40 acting in the direction indicated by arrow "B" (FIG. 2). Spring member 50 may have any one of several configurations, such as a coil spring, a spiral spring, a leaf spring, or any other configuration suitable for providing the required biasing force while being enclosable in sub-chamber 30-2. Spring member 50 is configured to have a spring constant that enables piston 40 to move along inflator housing 12 in a predetermined manner in response to pressure variations within the inflator body, as described in greater detail below. It will be appreciated that "operably coupled" simply means that the spring 50 be positioned between the end cap of housing 12 and the spring-biased gas release member 40. Accordingly, the spring 50 may be fixed to either or both components 28 and/or 40. Or, alternatively, the spring 40 may simply be positioned freely between the endcap 28 and the gas release member 40.

Spring member 50 may be formed from a metal, metal alloy, or a polymer material. In the embodiment shown in FIGS. 1 and 2, it is preferable that the configuration of spring member 50 and the material from which the spring member is formed combine to minimize the mass of the spring member. This reduces the static and dynamic inertia of the spring member during actuation of piston 40, thereby enhancing the responsiveness of the pressure regulation mechanism described herein.

It will further be appreciated that design considerations such as the type of propellant, and the burn characteristics thereof, and the pressure tolerances of the vessel 10, combined with the spring energy of a given spring member 50, and the total area of the gas exit orifices may be iteratively harmonized to result in a desired average pressure within the pressured vessel 10. As such, when properly equipped with the data typically developed in gas generant manufacture, such as the pressure and temperature characteristics required for an optimized combustion of the propellant, other design criteria such as the number and size of gas exit orifices, and the type and strength of the spring member may be appropriately and iteratively selected to result in a pressure vessel that essentially maintains an optimized average pressure. In sum, the spring 50 and the total gas exit aperture area sealed by the piston 40 may be either singularly or jointly evaluated on a trial and error basis depending on the propellant composition desired.

In an alternative embodiment, spring member 50 is not coupled to piston 40, but is rather positioned to contact and exert force on piston 40 after the piston has traveled a predetermined amount along inflator housing 12, in direction "A".

In operation, the pressure regulation mechanism incorporated in inflator 10 is designed to maintain the inflator internal pressure within a specified range determined to be an optimum pressure range for combustion of gas generant 16. It is desirable to maintain the internal inflator pressure within this pressure range for the majority of the combustion process.

Prior to activation of the inflator, piston 40 rests in the position shown in FIG. 1. In this position, seal 43 prevents fluid residing in the inflator between igniter 62 and seal 43 from exiting housing 12 through apertures 44. In operation, when deployment of the vehicle inflatable restraint system is desired, an activation signal is sent to igniter 62 operably associated with first chamber 20 of the inflator. Gas generant 16 positioned in first chamber 20 is consequently ignited, directly or via a booster propellant such as is known in the art. Ignition of the gas generant causes a rapid production of hot inflation gases in first chamber 20. Inflation gases flow through apertures 42 to inflate an associated airbag. The inflation gases also flow through buffer 52, then through internal wall 14 into second chamber 30.

As inflation gases flow into second chamber 30, the internal pressure in chamber 30-1 increases, causing piston 40 to move in the direction indicated by arrow "A", against the biasing force exerted on the piston by spring member 50. The spring constant of spring member 50 may be specified to enable piston 40 to move in direction "A" in response to a predetermined minimum inflation gas pressure acting on piston 40. In the embodiment shown in FIGS. 1 and 2, the spring constant is specified to enable piston to move in direction "A"

when the inflator internal pressure reaches a pressure residing at a midpoint of an ideal pressure range for combustion of gas generant 16 within the inflator. When the product of this predetermined inflation gas pressure and the area of piston face 41 becomes greater than the force exerted on piston by spring member 50, piston 40 will begin to move in direction "A". Pressure values much beyond this predetermined value of internal pressure may lie outside the desired pressure range. Thus, the pressure regulation mechanism is designed such that movement of piston 40 a certain distance in direction "A" opens apertures 44 to allow exit of inflation gas, thereby relieving pressure to prevent the inflation gas pressure from exceeding the desired pressure range. A greater pressure increase within the inflator produces a correspondingly greater movement of piston in direction "A", thereby uncovering more of apertures 44 and enabling a greater volumetric flowrate of inflation gas through the apertures, thereby further relieving the inflator internal pressure. Thus, the total open area of pressure regulation apertures 44 is proportional to the inflator internal pressure.

In addition, as the combustion reaction progresses and the internal inflator pressure begins to drop, spring member 50 forces piston 40 in direction "B", thereby covering more of apertures 44 and reducing the volumetric flowrate of inflation gas through the apertures, and correspondingly compressing the gas remaining in the inflator to maintain the inflator internal pressure within the optimum range for the combustion reaction.

In another embodiment (not shown), a torsion spring is used to rotationally bias the piston into a position in which it blocks the pressure regulation apertures prior to inflator activation. After inflator activation, a suitable increase in pressure produces a rotational motion of the piston against the torsion force exerted by the spring, which gradually uncovers the pressure regulation apertures to relieve excess internal gas pressure. As the pressure drops, the torsion spring acts on the piston to counter-rotate the piston, again gradually covering the apertures to block gas flow therethrough.

Inflator housings having configurations other than the cylindrical shape shown herein may be used, provided they are suitable for incorporating an embodiment of the pressure regulation mechanism described herein. Also, apertures 44 may have shapes (for example, holes) other than slots. In addition, the number and sizes of apertures 44 may be varied according to the pressure regulation requirements for the inflator.

The present invention helps to maintain the inflator combustion pressure within an optimum range during the majority of the combustion event by automatically and continually controlling the inflation gas exit aperture area. The pressure regulation mechanism disclosed herein greatly improves the ballistic performance of the inflator, while minimizing the generation of effluents due to low-pressure combustion.

Referring to FIG. 3, a gas generating system including a gas generator or inflator 10 described above is incorporated into an airbag system 200. Airbag system 200 includes at least one airbag 202 and a gas generator 10 as described herein coupled to the airbag so as to enable fluid communication with an interior of the airbag upon activation of the gas generating system. Airbag system 200 may also be in communication with a known crash event sensor 210 that is in operative communication with a crash sensor algorithm (not shown) which signals actuation of airbag system 200 via, for example, activation of igniter 62 (not shown in FIG. 3) in the event of a collision.

Referring again to FIG. 3, an embodiment of the gas generating system or an airbag system including an inflator of the present invention may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 160 are described in U.S. Pat. Nos. 5,743,480, 5,553,803, 5,667, 161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Exemplifying yet another gas generating system containing an inflator of the present invention, safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A vehicle occupant protection system comprising:
  a housing comprising at least one gas exit orifice, said housing farther defining an inner wall;
  a gas generating composition contained within said housing for producing combustion gases upon activation of said vehicle occupant protection system;
  a spring-biased gas release member in flush engagement with said inner wall, said gas release member employed for sealing said at least one gas exit orifice prior to activation of said vehicle occupant protection system, and, said gas release member slidably engaged with said inner wall upon production of combustion gases, thereby releasing gas from said at least one gas exit orifice;
  a spring operably coupled to said gas release member and to said housing, thereby affecting a resilient sealing of said at least one gas exit orifice both before and after activation of said gas generating system, said spring also facilitating sliding engagement of said gas release member with said inner wall;
  an internal wall secured within the housing to divide an interior of the housing into a first chamber and a second chamber;
  at least one opening formed in the internal wall to enable fluid communication between the first chamber and the second chamber; and
  at least one gas exit aperture formed in the housing to enable a flow of gas from the first chamber to an exterior of the housing, wherein the at least one gas exit orifice and the spring-biased gas release member are positioned within the second chamber.

2. The vehicle occupant protection system of claim 1 wherein, after activation of the vehicle occupant protection system, gas flows out of the housing only through the at least one gas exit aperture from the first chamber to an exterior of the housing when a pressure in the first chamber falls below a predetermined pressure range.

3. A gas generating system comprising:
a housing comprising at least one gas exit orifice, said housing defining an inner wall also containing said at least one gas exit orifice;
a gas generating composition contained within said housing for producing expanded gases upon activation of said gas generator;
a spring-biased gas release member in flush engagement with said inner wall, said gas release member sealing said at least one gas exit orifice prior to activation of said gas generator;
a spring operably coupled to said gas release member and to said housing thereby affecting a resilient sealing of said at least one gas exit orifice both before and after activation of said gas generator,
wherein upon activation of said gas generator, said spring-biased gas release member slidably engages said inner wall to open said at least one gas exit orifice;
an internal wall secured within the housing to divide an interior of the housing into a first chamber and a second chamber; and
at least one opening formed in the internal wall to enable fluid communication between the first chamber and the second chamber; and
at least one gas exit aperture fanned in the first chamber to enable fluid communication between the first chamber and an exterior of the housing after activation of said vehicle occupant protection system,
wherein the at least one gas exit orifice and the spring-biased gas release member are positioned within the second chamber.

4. A gas generating system comprising:
a housing;
an internal wall secured within the housing to divide an interior of the housing into a first chamber and a second chamber;
at least one opening formed in the internal wall to enable fluid communication between the first chamber and the second chamber;
at least one first gas exit aperture enabling a flow of gas from the first chamber to an exterior of the housing after activation of the gas generating system;
at least one second gas exit aperture enabling a flow of gas from the second chamber to an exterior of the housing after activation of the gas generating system; and
a mechanism for controlling a flow of gas through the at least one second gas exit aperture responsive to a pressure in the first chamber.

5. The gas generating system of claim 4 wherein the mechanism for controlling flow includes a spring-biased gas release member in slidable engagement a wall of the housing for at least partially blocking a flow of gas trough the at least one second gas exit aperture,
wherein the gas release member resides in a first position to completely block a flow of gas through the at least one second gas exit aperture,
wherein the gas release member is movable to a second position to partially block the flow of gas through the at least one second gas exit aperture,
wherein an area of an unblocked portion of the at least one second gas exit aperture through which gas can flow corresponds to the second position of the gas release member,
and wherein the second position of the gas release member corresponds to the pressure in the first chamber.

6. The gas generating system of claim 4 wherein, after activation of the gas generating system, gas flows out of the housing only through the at least one first gas exit aperture when a pressure in the first chamber falls below a predetermined pressure range.

\* \* \* \* \*

UNITED STATES PATENT AND TRADEMARK OFFICE
CERTIFICATE OF CORRECTION

PATENT NO. : 7,641,232 B2  
APPLICATION NO. : 11/361936  
DATED : January 5, 2010  
INVENTOR(S) : Patterson It is certified that error appears in the above-identified patent and that said Letters Patent is hereby corrected as shown below:

Column 1; Line 65; insert --10-- after inflator.

Column 7; Line 34; delete "fanned" and insert --formed--.

Column 8; Line 21; delete "trough" and insert --through--.

Signed and Sealed this

Ninth Day of November, 2010

David J. Kappos  
*Director of the United States Patent and Trademark Office*